United States Patent [19]

Sloot

[11] Patent Number: 5,179,331
[45] Date of Patent: Jan. 12, 1993

[54] PULSE WIDTH REGULATED HIGH VOLTAGE POWER SUPPLY USING RINGLESS FLYBACK TRANSFORMER

[75] Inventor: William J. Sloot, Elk Grove Village, Ill.

[73] Assignee: Computron Display Systems Division of Xcel Corporation, Elk Grove, Ill.

[21] Appl. No.: 683,287

[22] Filed: Apr. 10, 1991

[51] Int. Cl.⁵ .................. H01J 29/70; G09G 1/04
[52] U.S. Cl. ........................... 315/411; 315/387
[58] Field of Search .............. 315/411, 387; 363/21, 363/61; 358/190

[56] References Cited

U.S. PATENT DOCUMENTS

| | | | |
|---|---|---|---|
| 4,527,229 | 7/1985 | Imamura et al. | 315/411 |
| 4,531,181 | 7/1985 | Herz et al. | 363/21 |
| 4,808,906 | 2/1989 | Liepe | 358/190 |
| 4,890,210 | 12/1989 | Myers | 363/21 |
| 5,012,401 | 4/1991 | Barlage | 363/21 |

Primary Examiner—Gregory C. Issing
Attorney, Agent, or Firm—Louis Bernat

[57] ABSTRACT

A flyback transformer operable over a broad frequency range is used as a regulated high voltage power supply. A ringless, layer-wound transformer is operated far below its natural resonant frequency in response to a pulse width modulator which may be synchronized with a video display in order to prevent beat frequency images in a video display. Diodes are coupled between the layers of windings to reduce the leakage inductance and stray capacitance. The supply is particularly suitable for TV or monitor use but not exclusively, so any apparatus requiring a regulated high voltage supply may use the invention.

8 Claims, 3 Drawing Sheets

PULSE WIDTH REGULATED HIGH VOLTAGE POWER SUPPLY USING RINGLESS FLYBACK TRANSFORMER

This invention relates to high voltage power supplies and more particularly to variable frequency, high voltage power supplies having controllable flexibility through a use of a ringless flyback transformer. Furthermore, the use of a close coupled so-called "ringless" flyback allows both a use of pulse width regulation techniques not previously feasible and an operation over a broad frequency range.

Most high voltage power supplies operating in the 10-30 watt range center upon a sine wave oscillator operating at its self-resonant frequency. The output power regulation is achieved by controlling the energy in the sine wave which is applied to the powered device. Since an operation must be at the resonant frequency, a beat frequency is usually produced in the pattern displayed on a cathode ray tube (CRT) monitor. The usual approach toward removing the beat has been to control ripple and magnetic radiation. However, this approach has not always been successful.

There are many circuits which provide voltage supplies which are produced by flyback transformers. One type of flyback transformer is a device which is used in a television set, cathode ray tube monitor, etc. which generates voltages to control the movement of an electron beam in a cathode ray picture tube. The advantage of this use of a flyback transformer is that the transformer is a high quality device which, in addition to providing the horizontal scan function, can also provide the necessary high voltage and other auxiliary supplies. The disadvantages are that the high voltage is not regulated and is a function of scan width and beam current.

U.S. Pat. No. 4,616,300 is one example of a regulated high voltage power supply employing a resonant flyback transformer. This patent describes in detail the commonly held conception that a low voltage power supply utilizing a flyback transformer cannot really be modified to provide a truly high voltage (e.g., 10 KV or higher).

The reason for this commonly held conception relates to the use of a flyback circuit design wherein the storage inductance of a flyback converter is shunted by the stray capacitance of the secondary winding. This unavoidable stray capacitance appears because the secondary circuit of a high voltage transformer consists of many turns of wire. When operating at ultrasonic conversion frequencies, the stray capacitances produce resonance frequencies which are comparable with the power conversion frequency and which lock in the power supply frequency. Conventional techniques for producing fast switching voltage waveforms over a broad frequency range are feasible only if capacitances are relatively low. Therefore, a conventional flyback transformer with many wire turns and a high impedance does not lend itself to the high frequency switching techniques which are successfully applied to low voltage, low impedance power supplies.

The self-resonant frequencies of the inductive components of a low voltage, low impedance flyback transformer are much higher than the conversion frequency. However, as output voltages increase, and currents decrease, the self-resonant frequencies drop into the range of desired conversion frequencies. The load on the switching transistors becomes largely capacitive. Efficiency is then degraded by the substantial power required by this capacitance when there are fast voltage waveforms.

These problems are avoided only if the high voltage flyback transformer is made to function at the resonant frequency which is determined by the large stray capacitance of the secondary winding. This problem is described in detail in U.S. Pat. No. 4,616,300. One of the problems associated with this approach is that beats appear between the conversion frequencies and the horizontal scan frequency of the CRT (monitor). However, the transformer could be carefully designed and critically tuned to resonate at and synchronize with exactly the scan frequency of the monitor, thus avoiding the beat problem. The versatility of the design is then impaired since it is locked into a single scan frequency. The simple and direct regulation techniques of a pulse width modulation control is not possible with conventional transformers if an effort is made to apply them to a high voltage power supply. Control must be accomplished via frequency modulation techniques. This is also described in detail in U.S. Pat. No. 4,616,300.

In summary, the inventive low voltage, regulated flyback converter power supplies exhibit many desirable characteristics among which are: (a) operation is possible over a broad frequency range; (b) easily synchronized to any specific frequency directly as a result of item (a); (c) simply and economically regulated by well known and readily available pulse width modulator circuits (ICs); and (d) noncritical and economical transformer designs.

These desirable characteristics are not normally attainable in regulated high voltage flyback designs since there is the previously described high stray capacitance of the many wire turns of the secondary. An attainment of the desirable features of low voltage flyback power supply designs, therefore, involves an elimination or reduction of the undesirable stray capacitance of the secondary winding. These desirable characteristics can be attained if the capacitance is reduced to produce self-resonant frequencies comparable to low voltage designs. That is, if the self-resonant frequency is much higher than the desired conversion frequency.

Reduction of the capacitance to this degree has indeed been recently achieved by a new transformer design. This new design is referred to as "close coupled layer-wound technology" or simply "ringless" designs. The "ringless" relates to an electrical characteristic, not to a mechanical or structural attribute.

To understand the "ringless" design, a review of previous construction techniques is relevant. High voltage flyback construction prior to the "ringless" design was basically of two types, layer-wound and a slot bobbin. This terminology relates to the method of winding the high voltage secondary (sometimes called the "tertiary"). The high voltages involved dictate certain mechanical constraints which are imposed on the way the secondary is wound. These constraints result from the voltage gradient which builds between turns and layers of turns. The voltage gradient obviously cannot exceed the capabilities of the insulation.

The older layer-wound technology avoided excessive voltage gradients by making each layer narrow, with relatively few turns of wire. Insulation was placed between each layer and many layers were built up to produce the desired high voltage. This type of construction results in high stray capacitance and high leakage inductance as a result of the poor coupling between primary and secondary windings.

An improvement over this technology was the slot bobbin winding. Essentially, the secondary windings are placed on a bobbin in which a series of slots have been cut. The layers are, therefore, spread horizontally in relation to the core, rather than vertically as in the layer-wound. This improves the coupling factor and reduces the leakage inductance. The stray capacitance is, however, still quite high. The high stray capacitance and leakage inductance create resonances comparable to the desired conversion frequencies, as previously described. Neither type allows the broad frequency range of operation or the pulse width regulation techniques used by this invention.

Conversely, the new close coupled ringless construction avoids the high stray capacitance and leakage inductance, thus creating a resonance comparable to low voltage flyback converters. (Self-resonant frequencies are on the order of 150 KHz to 200 KHz.) These transformers are also layer-wound, but the layers are few and much wider (typically only 4 or 5 layers). These far fewer layers greatly reduce the stray capacitance. Excessive A.C. voltage gradients are avoided by individually rectifying each layer. That is, each layer is treated as a separate set of coils with a relatively small number of turns, and with diodes connected between the coils of adjacent layers. Leakage inductance is also greatly reduced since the layers are wound directly over the primary, thus resulting in very close coupling.

One source of such a ringless transformer is Totoku Electric Co., Ltd., 3-21, Okubo, 1-Chome, Shinjuku-ku, Tokyo, Japan.

Accordingly, an object of the invention is to provide new and improved controllable high voltage power supplies having a variable frequency capability. Here, an object is to provide a simple and reliable pulse width control over power supplies utilizing high voltage flyback transformers. Another object of the invention is to provide CRT displays with no beat patterns.

In keeping with an aspect of the invention, these and other objects are accomplished by providing a pulse width modulation control circuit which switches off and on a ringless high voltage flyback transformer. The pulse width modulator switches the power supply off and on at a rate which determines the output frequency of the supply and with a duty cycle which determines the level of high voltage supplied. Also, the inventive power supply operates at frequencies well below the natural self-resonant frequency of the flyback transformer. A tight regulation can be achieved over a broad range of input voltages (e.g. 10-volts to 150-volts).

The invention provides a basic modification of the conventional ringless flyback transformer by incorporating a high voltage capacitor for feedback purposes and for separating the tertiary winding and internal bleeder resistor. That is, the bottom of the tertiary winding and the bottom of the bleeder resistor are brought out to individual pins so that separate control circuits may be added thereto. The transformer design is non-critical, is economic and is reliable since it is a slightly modified commercially available mass produced item.

The invention will become more apparent from a study of the following specification taken with the accompanying drawings, in which.

Figure 1:
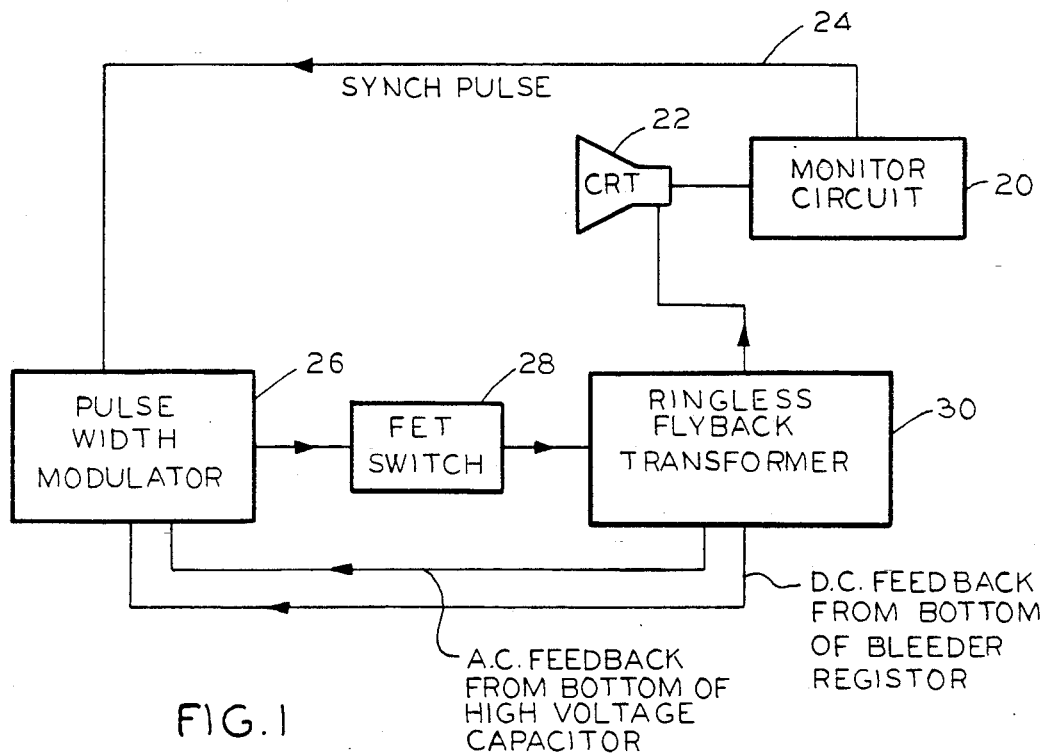
FIG. 1 is a block diagram of the inventive power supply.

The block diagram (FIG. 1) of the inventive high voltage power supply includes a monitor circuit 20 which supplies and controls the video and scan signals being fed to a cathode ray tube display unit 22. Monitor circuit 20 separates the sync pulses from the video signal and forwards them to a pulse width modulator 26 via wire 24. The pulse width modulator may be set to select a suitable and desired frequency and pulse width.

Figure 2:
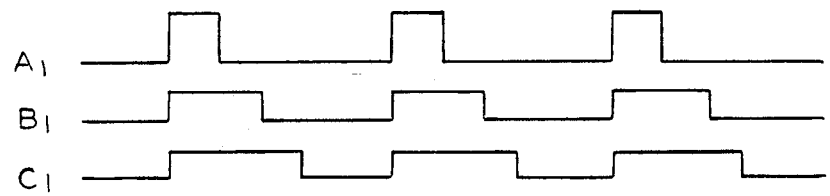
FIG. 2 is a series of voltage waveforms illustrating the pulse width modulation control.

By way of example, FIG. 2 shows three waveforms of various widths. Waveform A shows a duty cycle having a relatively short "on" period, long "off" period. Waveform B shows a duty cycle with a longer "on" and shorter "off" period. Waveform C shows a duty cycle with a still longer "on" and shorter "off" period. These three waveforms produce three different voltage levels at the transformer output. The on/off pulses may also be set to have any suitable pulse repetition rate or frequency. In a similar manner, the pulse width modulator 26 may be adjusted to provide any suitable frequency selection with any suitable level of energy transfer.

The output of the pulse width modulator 26 operates a suitable electronic switch 28 (here a MOSFET) that controls the on/off state of ringless flyback transformer 30. Thus, the transformer 30 may be switched on/off at any suitable selected rate and with any suitable selected duty cycle. The transformer 30 is operated substantially below its design frequency, in a free-ringing mode, so that its operation may be regulated independently of its natural resonant frequency. This design can operate over a broad frequency range, but still can be synchronized to the horizontal sweep frequency of the cathode ray tube monitor in order to totally eliminate beat patterns in the displayed video image. In one exemplary system, the output voltage could easily be adjusted to and regulated at virtually any level between 10 KV and 30 KV.

Figure 3:
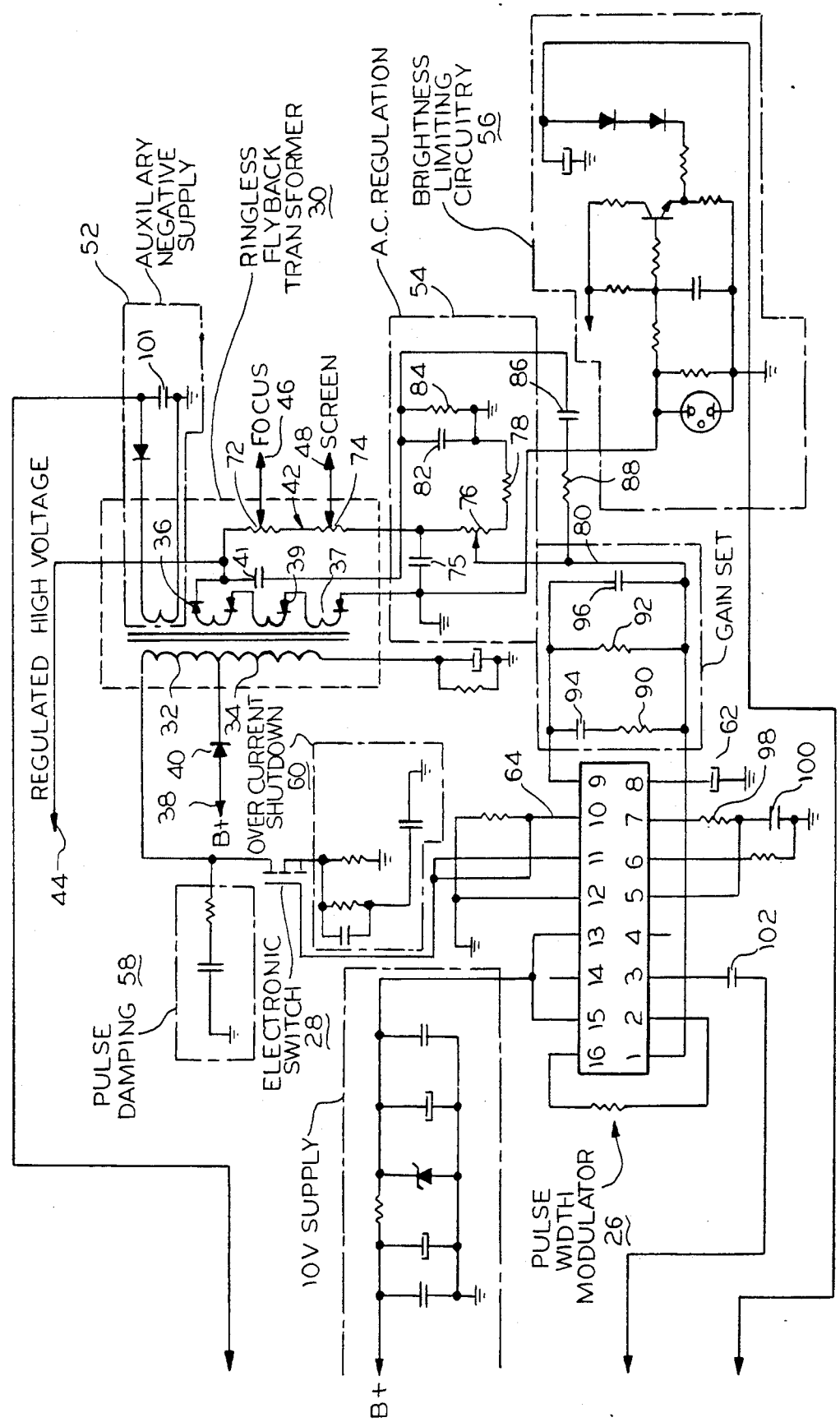
FIG. 3 is a complete circuit diagram of the inventive power supply.
Figure 4:
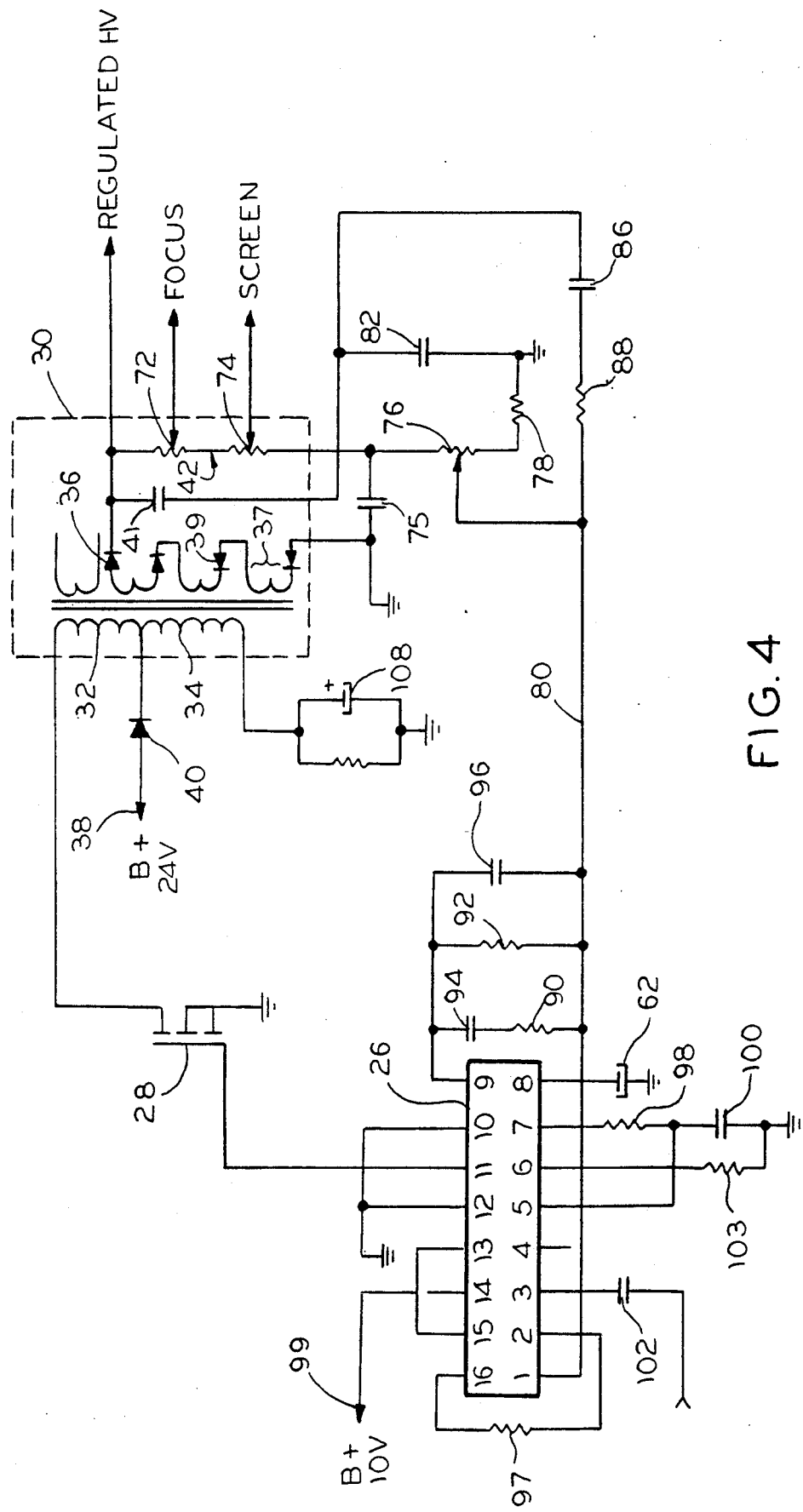
FIG. 4 is the same circuit diagram with an elimination of virtually all components which are not directly related to the invention.

Basically, FIGS. 3 and 4 are the same circuit insofar as the invention is concerned. FIG. 3 is a schematic diagram of the entire circuit. FIG. 4 includes only that part of the circuit which is most directly used in the invention.

The ringless flyback transformer 30 has a primary winding 32 and boost winding 34, positioned co-axially with a high voltage tertiary winding 36. The tertiary winding 36 has a number of sets of windings, such as 37. Each set of windings is a separate layer on the transformer. These serially related sets of windings are isolated from each other by suitable diodes, such as 39, in order to reduce the A.C. voltage gradient to prevent corona discharge. The relatively few layers result in a low level of stray capacitance. The close proximity to the primary winding creates a close coupling and low leakage inductance. It should be noted that a high voltage capacitor 41 and bleeder resistors 42 provide feedback for regulation control circuits.

The power for this transformer is supplied from B+ 38 through diode 40 to a junction between the primary and boost windings 32, 34. The output voltages are taken from a voltage divider 42. These voltages are a regulated high voltage 44 of the inventive power supply, a focus potential 46, and a screen potential 48.

One or more auxiliary windings 50 may be added to the transformer 30 in order to provide suitable extra voltages.

The A.C. component of the output voltage is sensed by a high voltage capacitor 41, connected to one end of the tertiary winding 36 of the transformer. A brightness limiting control circuit 56 is connected to the other end of the winding 36.

A pulse damping circuit 58 is coupled to one end of the primary winding 3 of the ringless flyback transformer 30. This circuit prevents excessive voltage spikes when electronic switch 28 switches the transformer off and on. A limiting circuit 60 is connected to the other side of the electronic switch 28 in order to shut down the circuit during overload conditions.

The pulse width modulator 26 is a standard commercial item, one example of which is sold by the National Semiconductor Corporation as an integrated chip LM1525A. The company describes this modulator circuit as a pulse width modulator which is designed to switch power supplies. A sync input to the oscillator permits multiple modulators to be slaved together, or a single modulator to be synchronized by an external system clock. A pin on the modulator provides a means for making a width range of deadtime adjustment by enabling any of many different resistors to be connected thereto. A built-in soft-start circuitry requires only a selected timing capacitor 62 to be added to the circuit. A shutdown pin 64 controls both the soft-start circuitry and the output stages, providing instantaneous turn-off with soft-start recycle for slow turnon.

These functions are also controlled by an undervoltage lockout which keeps the outputs off and the soft-start capacitor discharged for input voltages which are less than that required for normal operation. The undervoltage lockout circuitry features approximately 200 mV of hysteresis to prevent threshold oscillations. Another unique feature of these improved pulse width modulator integrated circuits is a latch following a comparator (thus preventing double-pulsing). Once a pulse width modulator pulse has been terminated for any reason, the outputs will remain off for the duration of the latch period. The latch is reset with each clock pulse.

While FIG. 3 shows the entire circuit, FIG. 4 shows only that part of FIG. 3 which is essential to an understanding of the invention.

The transformer 30 has a closely coupled, layer-wound construction. The voltage conversion frequency at which the invention operates the transformer is much lower than the natural resonant design frequency of the transformer, i.e., in one case the inventive circuit can operate over a 15 to 32 KHz range. Synchronization can, therefore, be accomplished at most of the common monitor scan frequencies. Monitors scanning at higher frequencies, for example 64 KHz, will also produce no beat patterns if the supply is synchronized to a sub-harmonic (i.e., 32 KHz).

The regulation of the voltage and frequency is accomplished via pulse width modulation from circuit 26 which switches the MOSFET 28 on and off. An addition of a high voltage capacitor 41 (100 pf.) senses high voltage, A.C. fluctuations and provides a D.C. separation between the winding 36 and bleeder resistors 72, 74 connections. This separation is desirable because a D.C. feedback regulation path is completed through winding 36 and via the bottom of the bleeder resistors 72, 74. The D.C. separation is also maintained by the capacitor 75 connected between the winding 36 and the potentiometer 72, 74.

More particularly, the high voltage is sensed through the resistive voltage divider 72, 74 and through resistors 76, 78, to ground. The high voltage output can be set at any suitable and desired value by an adjustment of potentiometer 76. In this case, the high voltage is set at a selected value of about 15 to 27 KV. This adjustment information is conveyed via line 80 to the pulse width modulator 26 which adjusts the "on" time of the MOSFET switch 28 in order to keep the high voltage constant. As shown in FIG. 2, the longer the MOSFET 28 is switched "on", the greater the amount of energy and therefore the higher the voltage that this power supply circuit provides.

The A.C. regulation is accomplished via the internal 100 pf. capacitor 41, and the filter/time constant networks formed by capacitor 82, resistor 84, capacitor 86, and resistor 88. The D.C. gain, A.C. gain, and response time of the pulse width modulator 26 is set by the resistors 90, 92 and capacitors 94, 96.

The slow or soft-start is set by the charge rate of capacitor 62. The free running or non-synchronized operating frequency is determined by resistor 98 and capacitor 100. In one case, the frequency was set to about 14 KHz which synchronizes to 15.7 KHz, and which was well below the natural resonance of the circuit.

Capacitor 102 provides a coupling in a path for a positive going TTL horizontal sync pulse which is received from the video display monitor. This synchronization prevents a cathode ray tube display of beat patterns between the high voltage circuits and monitor horizontal scan circuits.

Diode 40, the flyback transformer winding 34 and capacitor 108 comprise a "boost" circuit. In one circuit, the boost voltage charges capacitor 108 to about 70-volts which causes the circuit to function at a lesser B+ voltage than would otherwise be possible. In this case, the B+ is 24-volts. Operation without this boost circuit is possible provided that a higher B+ voltage is supplied. In this example, a B+ voltage of about 70-volts would be required to get an equivalent operation. The current drain from the power source would be reduced proportionately to achieve the same output power levels.

The following describes the circuit operation in greater detail. Capacitor 102 couples a positive going TTL pulse into the pulse width modulator 26 for synchronization, if desired. Synchronization at the monitors horizontal scan frequency or a sub-harmonic of this frequency is desirable if beat patterns are to be avoided in the display. Synchronization is possible provided that the free-run frequency of the pulse width modulator is set 10% lower than the synchronizing frequency. The free-run frequency is determined by the R/C time constants of resistor 103 and capacitor 100. Resistor 98 determines the maximum duty cycle of the pulse width modulator output.

Synchronization is not normally required in non-display applications. The frequency of operation can be simply determined by selection of resistor 103 or capacitor 100.

Capacitor 62 provides a so-called "soft-start" feature which limits the duty cycle upon turn-on at a rate which is proportional to the capacitance value. Resistors 90, 92 and capacitors 94, 96 determine the A.C. and D.C. gain of the regulation loop and, consequently, the degree of static regulation and the band-width of its dynamic response. Resistor 97 couples an internally regulated reference to the non-inverting input of the error op-amp. A regulated 10-volt D.C. 99 is applied to pins 13 and 15 on the pulse width modulator. This voltage was selected so that the so-called "totem pole" outputs of the pulse width modulator, pin 11, can directly drive the gate of power MOSFET 28.

The conduction time of MOSFET 28 is directly proportional to the amount of energy stored as magnetic flux in the core of ringless transformer 30. When MOSFET 28 turns off the rapidly collapsing magnetic field induces a high voltage into the tertiary winding proportional to this stored energy. The magnitude of this high voltage energy is, therefore, a function of the conduction time of MOSFET 28.

The conduction time of MOSFET 28 is determined by comparing the fixed voltage at the non-inverting input (pin 2) to the variable voltage applied to the inverting input (pin 1) of pulse width modulator 26. The D.C. portion of this voltage is derived by the setting of control potentiometer 76 and the divider action of the bleeder resistive network focus and screen controls, potentiometer 76 and resistor 78. Since this voltage division is connected to the high voltage output, the voltage at pin 1 is directly proportional to the high voltage and is of a magnitude determined by the control setting.

Positioning the control closer to ground causes a high voltage at the output to increase since the input to pin 1 is inverting. Similarly, if the high voltage output tends to increase, the feedback to pin 1 causes a decrease in pulse width, or the on time of MOSFET 28, thus reducing the output voltage. In this manner, the D.C. regulation is maintained over the varying CRT beam currents or load conditions.

Rapid A.C. fluctuations in beam current are sensed by the high voltage capacitor 41 and are fed back to pin 1 via resistor 88 and capacitor 101 (FIG. 3). Capacitor 82 acts as a very high frequency filter and A.C. divider. The combination of A.C. and D.C. feedback networks adjust the pulse width so as to produce a constant high voltage output regardless of any load fluctuations caused by the CRT video or brightness changes.

Any high voltage within the design limitations can be selected by manipulating the value of potentiometer 76 and resistor 78. By way of example, in one circuit the adjustment approximate range is from about 18 KV to about 27 KV. Regulation is not impaired regardless of the voltage selected.

Capacitor 75 removes the high frequency A.C. component from the bleeder divide.

A so-called "boost" circuit is formed by diode 40, winding 34 and capacitor 108. This circuit enables an operation at a lower B+ input than would otherwise be possible. Capacitor 108 charges to about 70-volts as a result of the transformer action and of the energy recovered during the clamped negative excursion of the flyback pulse. This boost voltage can be adjusted by controlling the turns in the winding 34 so that the operation is possible over a broad input voltage range. Operation is also possible without the boost function. In the example described, an identical operation would be achieved with a 70-volt input and with a corresponding reduction of input current, i.e., to produce the same power levels (wattage).

This basic circuit, and a proper selection of the component values can produce a highly regulated voltage output which is adjustable from several KV to as much as 30 KV, or higher, with a larger transformer configuration. Furthermore, this voltage level can be attained over a wide range of frequencies and can be synchronized at any desired frequency within this range.

Operation is also possible over a broad range of input voltages (approximately 10 to 150-volts) depending on the convenience or power output levels that may be required.

The described regulated high voltage supply is primarily for use with a color cathode ray tube monitor. However, the invention is not limited to that particular application. A slightly modified flyback transformer of a suitable power rating may use substantially the same circuitry to provide a lower powered 12-volt or 15-volt monochrome high voltage supply. The regulated high voltage output is adjustable over a wide range; and maintains a tight regulation at widely varying A.C. and D.C. load conditions. The major differences between the color and monochrome versions is the size of the transformer (power capability) and an absence of focus and screen controls which are not required on the monochrome version.

Those who are skilled in the art will readily perceive various modifications which may be made in the invention. Therefore, the appended claims should be construed to cover all equivalents falling within the true scope and spirit of the invention.

I claim:

1. A high voltage, variable frequency power supply comprising a closely coupled layer-wound ringless flyback transformer, diode means isolating separate layers forming at least one winding of said transformer for reducing interwinding stray capacitance and leakage inductance, a bleeder resistance having one end connected to one end of said one winding, a power output terminal connected to said one end of said one winding, a capacitor connected between the other ends of said bleeder resistor and said one winding whereby said one winding and said bleeder circuit may be connected to different control circuits, and an A.C. feedback circuit connected through a capacitor to said one end of said one winding.

2. The power supply of claim 1 wherein said at least one winding is a tertiary winding comprising a number of sets of turns, each set being a layer of wires on said ringless transformer, and said diode means being connected between each layer of wires forming said sets of turn in order to reduce leakage inductance and stray capacitance.

3. The power supply of claim 1 wherein said transformer has a primary winding, and an electronic switch coupled to energize and de-energize said primary winding, means comprising a pulse width modulator for controlling an on-off cycle of said electronic switch, said on-off cycle being a pulse repetition rate which is lower than the resonant frequency of said ringless transformer, and means for taking a regulated high voltage from one of of at least one winding of said ringless transformer, wherein said electronic switch is a MOSFET coupled between said primary winding and said pulse width modulator.

4. The power supply of claim 3 wherein said power supply provides a voltage at a frequency for energizing circuits which provide a video display, and means for applying horizontal sync pulses from said circuit for providing a video display to said pulse width modulator for synchronizign and eliminating beats between said power supply voltage frequency and frequencies in said circuit for providing a video display.

5. The power supply of claim 3 and a video display monitor, means for feeding back a D.C. signal from said other end of said bleeder resistor to said pulse width modulator for regulating said power supply to provide energy for a video display on said monitor.

6. The power supply of claim 1 and a pulse width modulator coupled to apply a potential to a second winding on said transformer for controlling an operating frequency of said power supply in response to said modulator, and means comprising said A.C. feedback circuit for regulating said pulse width modulator in response to A.C. signals passing through said modulator.

7. The power supply of claim 6 and soft-start means for controlling the characteristics by which said pulse width modulator applies a potential to said second winding.

8. The power supply of claim 6 and means associated with said pulse width modulator for setting the timing thereof thereby said modulator may be coordinated with external equipment or slaved together.

* * * * *

UNITED STATES PATENT AND TRADEMARK OFFICE
CERTIFICATE OF CORRECTION

PATENT NO. : 5,179,331
DATED : January 12, 1993
INVENTOR(S) : William J. Sloot

It is certified that error appears in the above-identified patent and that said Letters Patent is hereby corrected as shown below:

Col. 5, line 12, change numeral "3" to numeral --32--.

Col. 5, line 21, change "LM1525A" to --LM1525A/1527A--.

Col. 8, line 51, change "turn" to --turns--.

Col. 8, line 61, after "from one" delete "of" (first occurrence).

Col. 9, line 2, change "synchronizign" to --synchronizing--.

Col. 10, line 11, change "thereby" to --whereby--.

Signed and Sealed this

Eleventh Day of January, 1994

Attest:

BRUCE LEHMAN

Attesting Officer      Commissioner of Patents and Trademarks